US005373738A

United States Patent [19]

Abkowitz et al.

[11] Patent Number: 5,373,738

[45] Date of Patent: Dec. 20, 1994

[54] HUMIDITY DETECTOR

[75] Inventors: Martin A. Abkowitz, Webster; Homer Antoniadis, Rochester; Samson A. Jenekhe; Milan Stolka, both of Fairport, all of N.Y.

[73] Assignee: Xerox Corporation, Stamford, Conn.

[21] Appl. No.: 11,590

[22] Filed: Feb. 1, 1993

[51] Int. Cl.[5] .................. G01W 1/00; G03G 21/00; B32B 15/08; G01N 27/12

[52] U.S. Cl. .................. 73/335.04; 73/335.05; 73/335.03; 252/510; 252/511; 355/203; 355/208; 428/336; 428/337; 428/457; 428/469

[58] Field of Search .................. 204/403; 428/411.1; 420/457; 430/58, 59, 57; 548/324; 355/200, 203, 208; 118/644; 73/29.01, 29.02, 335.02, 335.03, 335.04, 335.05; 528/350, 353, 351, 336, 335; 252/510, 511

[56] References Cited

U.S. PATENT DOCUMENTS

| | | | |
|---|---|---|---|
| 3,992,205 | 11/1976 | Wiedemann | 430/58 |
| 4,156,757 | 5/1979 | Graser et al. | 428/411 |
| 4,251,612 | 2/1981 | Chu et al. | 430/59 |
| 4,265,990 | 5/1981 | Stolka et al. | 430/59 |
| 4,429,029 | 1/1984 | Hoffmann et al. | 430/57 |
| 4,442,422 | 4/1984 | Murata et al. | 338/35 |
| 4,556,622 | 12/1985 | Neumann et al. | 430/58 |
| 4,587,189 | 5/1986 | Hor et al. | 430/59 |
| 4,603,372 | 7/1986 | Abadie et al. | 361/286 |
| 4,620,942 | 11/1986 | Kam | 252/500 |
| 4,646,066 | 2/1987 | Baughman et al. | 340/540 |
| 4,761,710 | 8/1988 | Chen | 361/286 |
| 4,792,508 | 12/1988 | Kazmaier et al. | 430/59 |
| 4,882,254 | 11/1989 | Loutfy et al. | 430/59 |
| 4,965,698 | 10/1990 | Thoma et al. | 361/286 |
| 4,983,741 | 1/1991 | Katayama et al. | 548/324 |
| 5,034,772 | 7/1991 | Suzuki | 355/208 |
| 5,055,367 | 10/1991 | Law | 430/59 |
| 5,177,549 | 1/1993 | Ohtsuka et al. | 355/284 |
| 5,205,920 | 4/1993 | Oyama et al. | 204/403 |
| 5,248,580 | 9/1993 | Stolka et al. | 430/59 |

OTHER PUBLICATIONS

Journal of Polymer Science: Polymer Chemistry Edition, "New Imidazoisoquinoline Ladder Polymers", A. J. Sicree et al., vol. 12, pp. 265 to 272 (1974).

*Primary Examiner*—D. S. Nakarani
*Assistant Examiner*—Vivian Chen
*Attorney, Agent, or Firm*—E. D. Palazzo

[57] ABSTRACT

A humidity detector with a supporting substrate and a ladder polymer coating, which can be utilized in xerographic imaging and printing apparatuses.

32 Claims, 2 Drawing Sheets

HUMIDITY DETECTOR

BACKGROUND OF THE INVENTION

This invention is generally directed to humidity detectors comprised of ladder polymers. More specifically, the present invention is directed to ultrasensitive relative humidity detectors, or humidity sensors comprised of a ladder polymer or ladder polymers, and which detectors can be selected for electrostatic imaging and printing apparatuses. Also, the humidity sensors or detectors of the present invention can be incorporated in feedback, such as known feedback control circuit and control systems. In embodiments, the humidity detectors of the present invention have a dc dark conductivity of $5\times10^{-14}$ (ohm-cm)$^{-1}$ which increases by more than about three orders of magnitude to $5\times10$-$10^{-1}$ (ohm-cm)$^{-1}$ when the relative humidity in air increases to, for example, 50 percent. The humidity can be measured by a number of known methods, such as by utilizing a humidity detector, like the VAISALA Model HM132, and the dark conductivity can be measured by utilizing, for example, an electrometer, like the electrometer model Keithley 617. With the sensors of the present invention, relative humidities of from, for example, zero to about 95 percent can be measured in embodiments to provide feedback information for adjusting corona charging currents in imaging and printing systems, such as reprographic and electrostatic imaging systems. Also, in embodiments the detectors, or sensors of the present invention can be utilized to adjust and control the developer composition bias voltage in, for example, imaging and printing systems, and to maintain excellent developed image copy quality independent of environmental humidity.

Ladder polymers that can be selected for the invention of the present application are illustrated in U.S. Pat. No. 5,248,580, the disclosure of which is totally incorporated herein by reference. More specifically, there is illustrated in this copending patent application photoconductive imaging members with a photoconductive ladder compound, such as an imidazoquinoline ladder polymer like poly(7-oxo-7,10H-benz[de]-imidazo(4',5':5,6) benzimidazo[2,1-a]isoquinoline-3,4:10,11-tetrayl)-10-carbonyl), which polymers may be a cis-, trans- or mixture of cis- and trans-isomers referred to as BBL or poly(benzimidazole-benzophenanthroline)-type ladder and closely structurally related benzimidazole-benzophenanthroline-type semi-ladder polymer referred to as BBB which polymers may be a cis-, trans- or mixture of cis- and trans-isomers. Examples of ladder polymers that may be selected as the photogenerating pigments for the imaging members of the copending application include those of formulas illustrated in FIGS. 2 through 7 representing the representative structures of BBL, BBB, BBL-N, BBL-P, BBL-DBF and BBL-AQ, respectively, where the subscript n is an integer representing the number of segments, and the value of which in embodiments is greater than about 10, and is in the range of from about 10 to about 1,000.

SUMMARY OF THE INVENTION

It is an object of the present invention to provide humidity detectors or sensors.

Another object of the present invention is to provide ultrasensitive humidity detectors, or sensors comprised of ladder polymers.

In another object of the present invention there are provided humidity detectors comprised of a ladder polymer or mixtures thereof, and which detectors can be selected for the measurement of relative humidity in, for example, electrostatic imaging and printing machines.

Moreover, in another object of the present invention there are provided ultrasensitive humidity detectors comprised of a ladder polymer situated between two substrates like semitransparent metals, such as gold or silver electrodes.

Another object of the present invention relates to humidity sensors or detectors which can be used for extended time periods such as, for example, over 1,000,000 imaging cycles in an electrostatic imaging apparatus, such as the Xerox Corporation 5100, and wherein the detectors, which are resistant to heat in excess of 400° C., allow sensor baking and restoration of the sensor function when they, for example, become wet, similar to what is enabled with costly lithium salt sensors.

In another object of the present invention there are provided humidity sensors comprised of a ladder polymer, or mixtures thereof with electrical and dielectrical characteristics extraordinarily sensitive to relative humidity or moisture.

These and other objects of the present invention in embodiments thereof can be accomplished by the provision of humidity detectors or sensors. More specifically, the present invention is directed to ultrasensitive humidity detectors comprised of a ladder polymer or mixtures thereof, such as an imidazoquinoline ladder polymer like poly(7-oxo-7,10H-benz[de]-imidazo(4',5':5,6) benzimidazo[2,1-a]isoquinoline-3,4:10,11-tetrayl)-10-carbonyl), which polymers may be a cis-, trans- or mixture of cis- and trans-isomers referred to as BBL or poly(benzimidazole-benzophenanthroline)-type ladder and closely structurally related benzimidazole-benzophenanthroline-type semi-ladder polymer hereinafter referred to as BBB, which polymers may be a cis-, trans- or mixture of cis- and trans-isomers. Examples of specific ladder polymers that may be selected include those of formulas illustrated in FIGS. 2 through 7, representing BBL, BBB, BBL-N, BBL-P, BBL-DBF and BBL-AQ, respectively, where the subscript n is an integer representing the number of segments, and the value of which in embodiments is greater than about 10, and is in the range of from about 10 to about 5,000 and preferably to about 1,000.

The ladder polymers selected for the detectors of the present invention may be prepared and characterized by the methods of S. A. Jenekhe and P. O. Johnson, described in *Macromolecules,* 23, 4419 (1990) and references therein, *Journal of Polymer Science,* Polymer Chemistry Edition, Volume 12, pages 265 to 272, 1974, A. J. Sicree, F. E. Arnold and R. L. Van Deusen, the disclosures of which are totally incorporated herein by reference, other similar and related prior art methods, and the methods as illustrated in U.S. Pat. No. 5,248,580, the disclosure of which is totally incorporated herein by reference.

More specifically, BBL can be prepared by a two step dehydrohalogenation-polycondensation sequence using 1,4,5,8-naphthalene tetracarboxylic acid (NTCA) and 1,2,4,5-tetraaminobenzene tetrahydrochloride (TABH).

Initially, TABH was heated with polyphosphoric acid to liberate hydrogen chloride gas and to afford 1,2,4,5-tetraaminobenzene in situ. Next, NTCA and then phosphorous pentoxide are added to the vessel and then heated under an inert and anhydrous atmosphere to effect polycondensation of NTCA and TABH in approximately equimolar amounts. This product is high melting and metallic golden-green in appearance. BBB semi-ladder polymers can be prepared by the polycondensation of NTCA and 3,3'-diaminobenzidine (DABD) using a procedure analogous to the aforementioned BBL synthesis. Specifically, pure, chlorine free, DABD can be polycondensed with NTCA in approximately equimolar amounts. This product was high melting and similar in appearance to the aforementioned BBL.

The resulting ladder and semi-ladder polymers were characterized by intrinsic viscosity, thermogravimetric analysis, infrared spectra, and electronic absorption spectra of thin films.

In embodiments, there is envisioned a humidity detector comprised of a supporting conducting substrate, or a plurality of substrates, for example from 1 to about 10, such as an effective metal like gold, aluminum, steel, copper, nickel; metalized polymers like polyester, nickel coated polyesters, copper coated polyesters, indium-tin oxide covered glass plates and the like, of any practical thickness from, for example, about 200 Angstroms to several millimeters, such as 5 millimeters, wherein the ladder polymer, whose thickness can be from about 0.5 micron to about 5 microns, or other effective thickness, is situated on top of the substrate, and a thin, from about 100 to about 200 Angstroms, or other effective thickness, moisture-permeable electrode comprised of, for example, gold or silver situated on top of, or thereover, the ladder polymer. In embodiments, the ladder polymer or polymers can thus be situated in between or sandwiched between electrodes, preferably two electrodes, or substrates, at least one of which is permeable to, or can detect moisture. In the sandwich form, in embodiments there is usually selected as a substrate a thin electrode enabling permeability to moisture, and a second substrate electrode which is also conductive. With the coplanar embodiments illustrated herein, the substrate or substrates are insulating and electrodes are contained on a ladder polymer layer which layer is in contact with the substrate.

In another embodiment of the present invention, there is envisioned a humidity detector in a coplanar configuration comprised of an insulating, that is essentially nonconducting with, for example, a conductivity of about $10^{-10}$ or less S (Siemens) per centimeter substrate, such as glass, a polyester sheet and the like, on top of which is situated a thin film, for example from about 0.5 to about 5 microns, of a ladder polymer and situated on the surface thereof two electrodes spaced from each other, such as from about 1 micron to about 5 millimeters, and not in contact therewith, and providing that moisture is permitted to contact the ladder polymer, or the ladder polymer is permitted to detect such moisture. Other humidity sensor configurations can be envisioned, and in all these configurations it is important that moisture be permitted to contact the ladder polymer.

Examples of substrates include any suitable component that will enable the detector to function for its intended purposes. Examples of substrates or conducting electrodes include suitable metals such as gold, silver, and the like, as illustrated herein, and wherein the substrate is of various effective thicknesses, such as for example about 100 to about 500 Angstroms. The substrate in embodiments may comprise an insulating material, such as an inorganic or organic polymeric material, including MYLAR®, a commercially available polymer, and titanized MYLAR®; a layer of an organic or inorganic material having a semiconductive surface layer such as indium tin oxide or aluminum arranged thereon; or a conductive material such as aluminum, titanium, chromium, nickel, brass, or the like. As indicated herein, the aforementioned detectors or sensors can be incorporated into a measuring circuit with a voltage source and connecting wires. The ladder polymer and other optional layers can be applied or deposited on the substrate by a number of known coating means, such as dip coating, spray coating, solution coating, vacuum evaporation, and the like; or the substrate or substrates can be deposited on the ladder polymer by similar methods; and wherein the solution of the ladder polymer is prepared by the methods of S. A. Jehneke and P. Johnson, *Macromolecule*, Vol. 23, pages 4419 to 4429, the disclosure of which is totally incorporated herein by reference. For the coplanar detector configuration, a similar method is used and wherein there is deposited, preferably by vapor deposition, electrode areas, especially two on the surface of the ladder polymer.

BRIEF DESCRIPTION OF THE FIGURES

For a further understanding of the the present invention, the following detailed description of various embodiments is provided wherein.

DESCRIPTION OF SPECIFIC EMBODIMENTS

Specific embodiments of the invention will now be illustrated, it being noted that substantially equivalent detectors are also embraced within the scope of the present invention.

Figure 1:
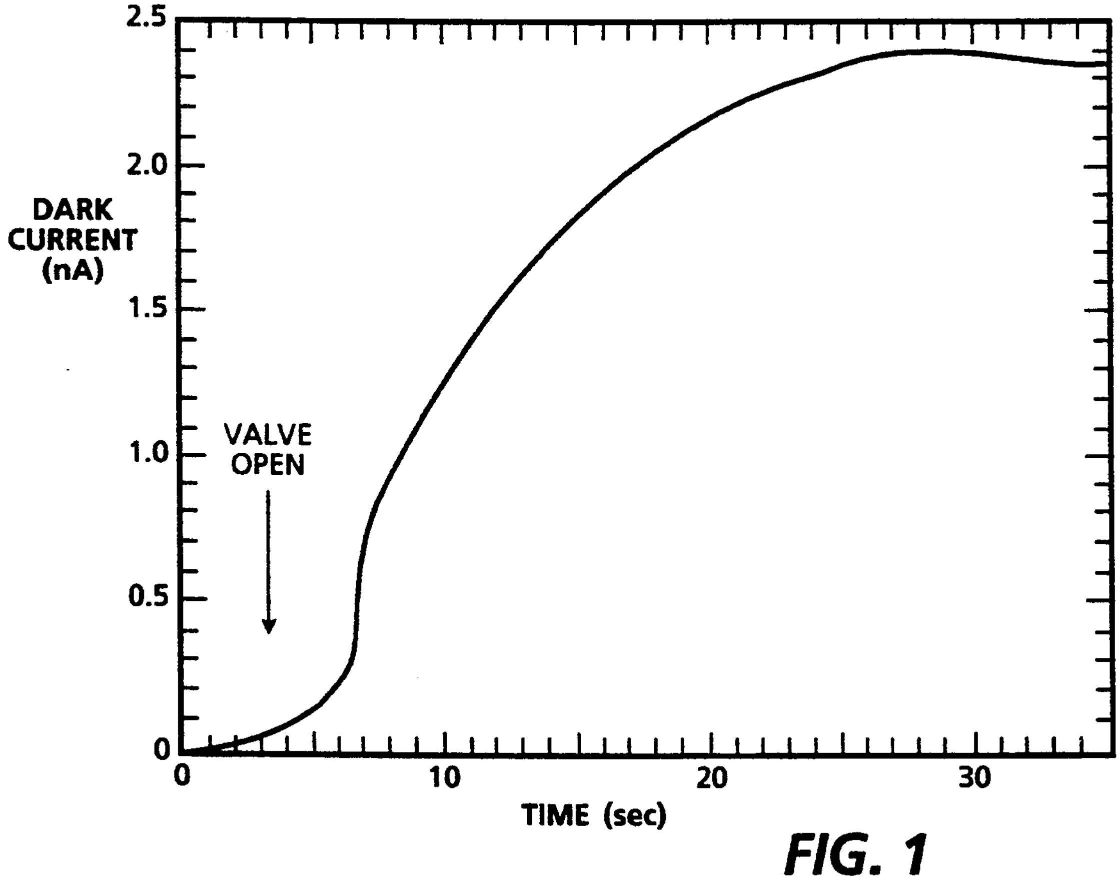
FIG. 1 is a line graph illustrating a number of characteristics of the detectors of the present invention wherein nA represents nanoamps and valve open is the point at which the humidity or moisture, like moist air, is introduced.
Figure 2:
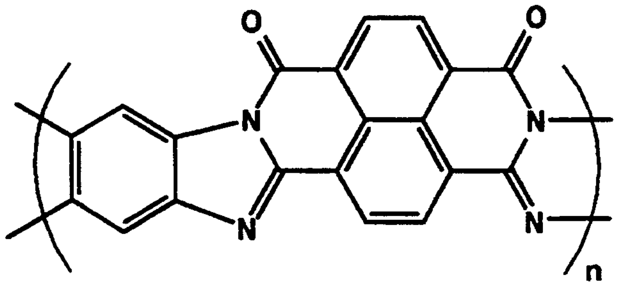
FIGS. 2, 3, 4, 5, 6 and 7 are formulas representative of ladder polymer compounds that can be selected for the detectors of the present invention wherein n is as illustrated herein, for example a number of from about 10 to about 5,000.
Figure 3:
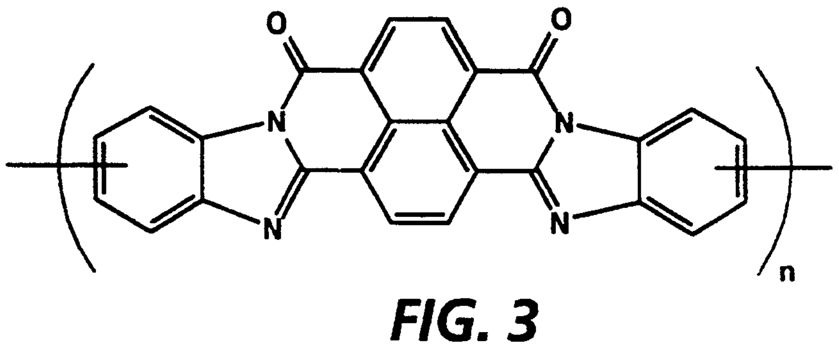
Figure 4:
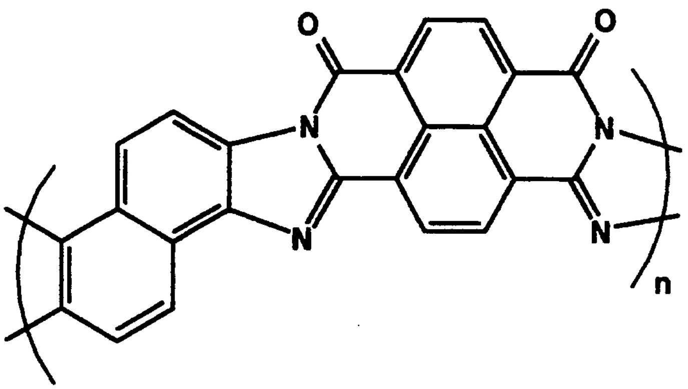
Figure 5:
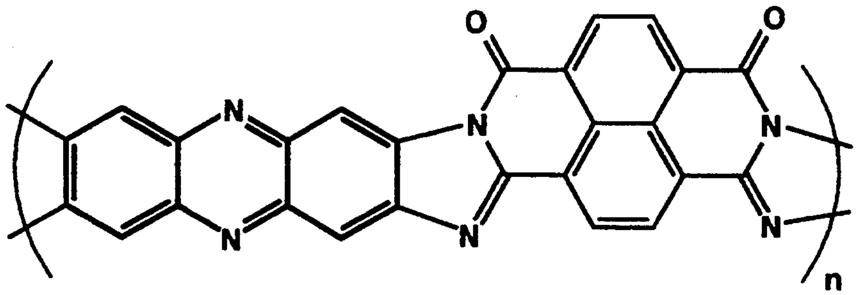
Figure 6:
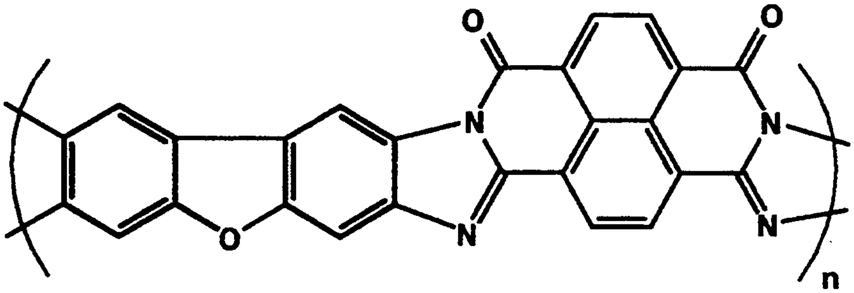
Figure 7:
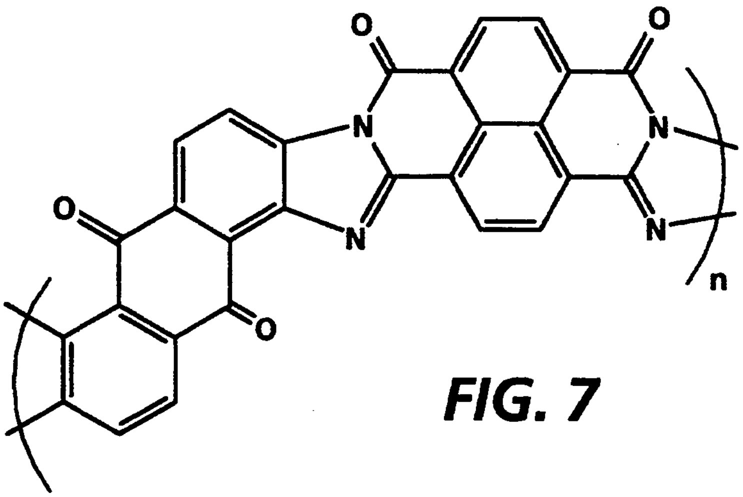

In FIG. 1, the y-axis represents dark current that passes through the humidity sensor of the present invention, reference the BBL detector of Example IV, and which current was measured with an electrometer, such as an Electrometer Model Keithley 617 with an integral power supply, and the x-axis represents time in seconds at which the measurements were accomplished. Thus, after the beginning of the conductivity measurement performed on a sample specimen detector of the present invention which detector was enclosed in a cryostat chamber of about 100 $cm^3$ and evacuated for about one hour to a vacuum of about $10^{-3}$ Torr to remove all of the moisture from the chamber the electric current was $6\times10^{-11}$ A, and that current remained constant until the chamber was exposed to the outside atmosphere simply by opening a valve which exposed the detector to moist air, about 50 percent RH. The moist air flow into the chamber was initiated 10 seconds after the beginning of the conductivity measurements. FIG. 1 also shows that in a total of about 15 seconds after the initiation of moist air flow into the chamber the electric current passing through the detector achieved an equilibrium value of $2\times10^{-9}$ A.

The following Examples are being supplied to further define various species of the present invention, it being noted that these Examples are intended to illustrate and not limit the scope of the present invention. Parts and percentages are by weight unless otherwise indicated.

PURIFICATION OF REACTANTS AND REAGENTS 1,4,5,8-Naphthalene tetracarboxylic acid (NTCA), 97 percent pure, obtained from Aldrich Chemical Company, was purified as follows: 10 grams of NTCA were dissolved in 1,000 milliliters of deionized water containing 84 grams of potassium hydroxide at 60° C. Subsequently, 20 grams of activated charcoal were added to the aforementioned solution, which was then stirred for 10 minutes. The resulting suspension was filtered through a combination of Celite and Whatman filter paper under vacuum. This decolorization procedure was repeated to obtain a faint yellow color flitrate. Four (4) grams of potassium permanganate were dissolved in 80 milliliters of water at 90° C. and were added to the flitrate obtained. The dark solution was filtered while still hot through fritted glass. The flitrate was allowed to cool down to 60° C. before decolorizing further with 20 grams of activated charcoal arid filtered through a combination of Celite and filter paper. The filtration step was repeated with Whatman paper to ensure complete removal of traces of solids. The addition of 120 milliliters of hydrochloric acid was used to precipitate out NTCA. The material was filtered, washed with deionized water and dried under vacuum over phosphorous pentoxide at 60° C. for 24 hours.

1,2,4,5-Tetraaminobenzene tetrahydrochloride (TABH), technical grade, obtained from Fluka Chemical Company, was purified by the method reported by F. E. Arnold and R. L. Van Deusen, *Macromolecules,* 2, 497 (1969), the disclosure of which is totally incorporated herein by reference. 500 Milliliters of deionized water was boiled while bubbling nitrogen (ultra high purity grade) through. Subsequently, 50 milliliters of concentrated hydrochloric acid were added while maintaining the nitrogen stream. Ten (10) grams of TABH were dissolved in the aqueous HCl solution and 7 grams of activated charcoal were added. The suspension was stirred for 15 minutes then filtered through fritted glass. Thereafter, 100 milliliters of concentrated HCl were added to the clear flitrate and placed in a dry ice-methanol bath, while maintaining the nitrogen stream. The precipitate was recovered and dried over phosphorous pentoxide in an Abderhalden drying apparatus with refluxing hexane for 24 hours providing a purified, about 99.5 percent pure, (TABH).

3,3'-Diaminobenzidine (DABD) was obtained from Aldrich Chemical Company and purified further by the above procedure with respect to the purifiction of TABH.

Polyphosphoric acid (PPA) and phosphoric acid (ACS reagent grade) were obtained from Aldrich Chemical Company and used as received. Phosphorous pentoxide, $P_2O_5$, was obtained from J. T. Baker Inc. and was used as received.

SYNTHESIS AND CHARACTERIZATION OF BBL AND BBB BY POLYCONDENSATION REACTIONS

Although it is not desired to be limited by theory, factors believed to be important in achieving high molecular weight preferred BBL and BBB compounds are high purity of the starting monomers; use of monomers in appropriate stoichiometric amounts, preferably equimolar quantities; maintaining high effective phosphorous pentoxide, $P_2O_5$, content; and high concentration of reactants of, for example, greater than or equal to about 10 weight percent.

EXAMPLE I

Synthesis of BBL

Polybenzimidazo-benzophenanthroline-type ladder polymer (BBL) was prepared by the polycondensation of the aforementioned purified NTCA and the purified TABH following the aforementioned general method of Arnold and Van Deusen, and the addition method of J. F. Wolfe, Proc. ACS Div. *Polym. Mat. Sci. Eng.,* 54, 99 (1986), the disclosures of which are totally incorporated herein by reference. 85.65 Grams of a 77 percent solution of PPA (polyphosphoric acid) and 23 percent of water were prepared by diluting 60.8 grams of 83.3 percent PPA with 24.84 grams of phosphoric acid. The mixture was shaken vigorously and heated under vacuum to 100° C. for 2 to 3 hours and allowed to cool down to room temperature, about 25° C., over 16 hours. The vacuum was replaced by a nitrogen atmosphere. To prepare 5 grams of BBL, 4.248 grams (14.96 millimols) of TABH were carefully weighed and placed in a custom made (from ACE Glass Company), 500 milliliters, reaction vessel with provisions for a throughbore mechanical stirrer, vacuum line, nitrogen inlet and vent, and a side arm for adding reagents. There were added to the reactor 26 grams of 77 percent PPA under a nitrogen purge. Vacuum grease was carefully applied to all joints to prevent leaks. The reaction vessel was immersed in a 2,000 milliliter beaker oil bath. The beaker was placed on a PMC programmable hot plate/stirrer with a temperature probe immersed in the oil bath. The entire set up was supported by a Cole Palmer "Jiffy-Jack" which allowed for easy control and moderation of the reaction and the height of the reaction vessel such that the reaction mixture did not rise above the mechanical stirrer paddles. Dehydrochlorination was carried out at 80° to 90° C. under vacuum of 600 to 750 millimeters of Hg. Complete dehydrochlorination is achieved when all outgassing ceases. The vacuum was released under nitrogen and the temperature allowed to cool to 50° C. for NTCA addition. 4.55 Grams of NTCA (14.96 millimols) were added under nitrogen to the reaction vessel. The mixture was stirred slowly, about 25 rpm, for 20 minutes and then 17 grams of phosphorous pentoxide ($P_2O_5$) were added using a Tygon tube. The temperature was increased to 80° C. with the reaction vessel under vacuum. The stirring speed was increased slowly and nitrogen gas was allowed to enter into the vessel occasionally. After complete dissolution of the monomers and $P_2O_5$, vacuum was released and the temperature was raised in stages of 100°, 140°, 160°, 180° C. over 6 hours. This was accompanied by noticeable solution color changes, orange to red and eventually to metallic green. The reaction was allowed to proceed for 24 hours at 180° C.

The highly viscous polymerization solution was allowed to cool down to 60° C. and the polymer was scooped out with a TEFLON®coated spatula. The product was then precipitated by suspending it in deionized water and the mixture was refluxed for 3 days. The water was changed at least twice each day to ensure that the polymer product was free of residual phosphorous containing contaminants. The product was identified as BBL by comparison of spectral and physical data with those reported previously.

EXAMPLE II

Synthesis of BBB

Polybenzimidazo-benzophenanthroline semi-ladder polymer (BBB) was prepared by the polycondensation of 1,4,5,8-naphthalene tetracarboxylic acid (NTCA) and 3,3'-diaminobenzidine (DABD) by essentially repeating the procedure of Example I. With pure and chlorine free 3,3'-diaminobenzidine, that is 3,3',4,4'-diaminobenzidine, a dehydrochlorination step of a hydrochloride salt is not required. However, for achieving product purity of greater than 99 percent of the ladder polymers and maximum photosensitivity, a dehydrochlorination procedure ensures complete elimination (thermal liberation) of residual hydrogen chloride from the benzidine. This was accomplished by following the approach illustrated in the aforementioned purification of TABH.

Characterization

Intrinsic viscosity [η-eta] was measured in methanesulfonic acid at 30° C. BBL has an intrinsic viscosity of 8.2 dl/gram while that of BBB was 3.7 dl/gram. These intrinsic viscosity data indicate that the polymers have high molecular weights, for example BBL in the range of about 25,000 to about 200,000, and BBB of about 100,000 to about 200,000, which characterization has been reported, for example, by G. C. Berry and S. P. Yen, Addition and Condensation Polymerization Processes, *Advances in Chemistry Series No.* 91; ACS; Washington, D.C., 1969; pages 734 to 756, the disclosures of which are totally incorporated herein by reference. Thermogravimetric Analysis (TGA) in nitrogen revealed that BBL was stable up to 720° C. without showing any weight loss while BBB was stable up to about 700° C. in agreement with previously reported data. Infrared spectra were in agreement with previously published spectra. The electronic absorption spectra of thin films of BBL and BBB show visible absorption bands (pi to pi star transitions) at 560 and 540 nanometers, respectively, which are in agreement with values reported in the literature, S. A. Jenekhe and P. O. Johnson, *Macromolecules*, 23, 4419 (1990), the disclosure of which is totally incorporated herein by reference.

EXAMPLE III

A BBL film, prepared as described above, of a thickness $4\times10^{-4}$ centimeters was sandwiched between two semitransparent gold electrodes of the square area of 0.08 $cm^2$, each of about 200Å in thickness, by vacuum evaporating semitransparent gold on the two opposite faces of the ladder BBL polymer. The resulting humidity detector was then connected to external measurement circuit, and then placed in a vacuum chamber, which chamber was evacuated to a low pressure of $10^{-3}$ T for about 16 hours (overnight). The vacuum measurement of DC dark conductivity with an electrometer, Keithley 617, showed a value of $4\times10^{-14}$ (ohm-cm)$^{-1}$. The electric field dependence of dark current density (A/$cm^2$) in a vacuum (0 percent RH) was a straight line. Then moist air of 50 percent relative humidity, as measured with a Vaisala Model HMI32 electrometer, was quickly admitted, about 10 seconds, at 22° C. to the vacuum chamber, and within about 20 seconds the dc conductivity was elevated by more than about three orders of magnitude to $5\times10^{-10}$ (ohm-cm)$^{-1}$. The conductivity of the detector cycles reproducibly between these values with humidity. Measurements with dry oxygen and nitrogen evidenced no change in conductivity relative to the values obtained in the vacuum.

The phenomenon is substantially completely reversible; removal of humidity or moisture from a measurement cell, or the above chamber by evacuating restored the original conductivity to $4\times10^{-14}$ (ohm-cm)$^{-1}$.

EXAMPLE IV

A thin film, about a 1 μm (micron) sample of BBL, prepared as described above, reference Example III, (about 0.08 $cm^2$ area) sandwiched between two 200Å gold electrodes was placed in a cryostat of approximately 100 $cm^3$ in volume, which cryostat was then briefly evacuated, about 1 hour, to about $10^{-3}$ Torr. The conductivity was a measured $2\times10^{-14}$ (ohm-cm)$^{-1}$. Air of approximately 50 percent RH was then introduced simply by opening a valve connected to the vacuum chamber. The whistling sound of incoming air persisted for approximately 10 seconds, which is comparable to the time in which the maximum conductivity of $2.5\times10^{-12}$ was reached. This indicates that the rate of delivery of air to the detector was slower than the detector's response. The increase in conductivity in this detector is shown in FIG. 1.

A commercial humidity indicator unit with benchmark performance (Vaisala HMP 35 with a HUMICAP-H sensor) has a 90 percent response in 5 seconds at 20° C.

Detectors containing a BBL film thickness of $4\times10^{-4}$ centimeters having a conductivity of $4\times10^{-14}$ (ohm-cm)$^{-1}$ in a vacuum of $10^{-7}$ Torr have their dark conductivity elevated by about three orders of magnitude to $10^{-10}$ (ohm-cm)$^{-1}$ when the relative humidity in air is about 50 percent, reference for example FIG. 1.

Other modifications of the present invention will occur to those skilled in the art subsequent to a review of the present application. These modifications, and equivalents thereof are intended to be included within the scope of this invention. For example, the ladder polymer can be continuously or semicontinuously coated on a supporting substrate in embodiments.

What is claimed is:

1. A humidity detector comprised of a supporting substrate and thereover a ladder polymer selected from the group consisting of those represented by the following formulas

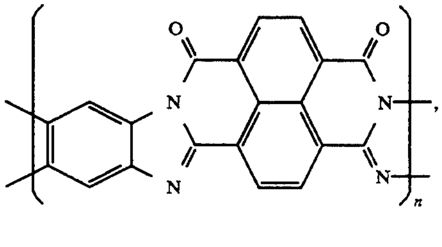
,

-continued

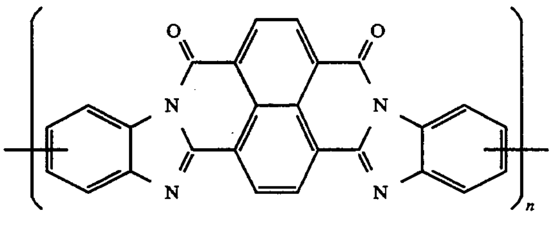

and mixtures thereof, wherein n represents the number of segments.

2. A humidity detector consisting essentially of a plurality of substrates and thereover or therebetween a ladder polymer selected from the group consisting of those represented by the following formulas

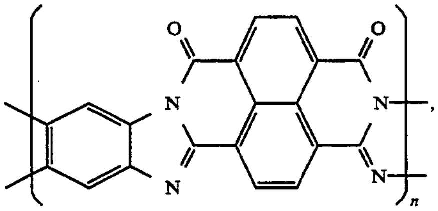

,

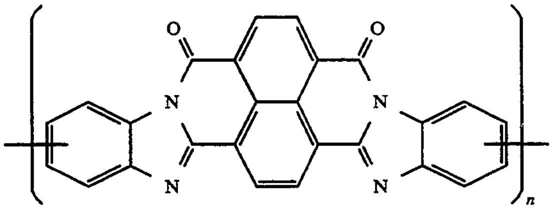

and mixtures thereof, wherein n represents the number of segments and is a number of from about 10 to about 1,000.

3. A detector in accordance with claim 2 wherein two substrates are selected.

4. A detector in accordance with claim 3 wherein the substrates are comprised of the metals gold, silver, nickel, or indinium tin oxide.

5. A detector in accordance with claim 2 wherein said ladder polymer is situated between two conductive substrates.

6. A detector in accordance with claim 5 wherein the thickness of each substrate is about 200 Angstroms.

7. A detector in accordance with claim 2 wherein the plurality of substrates are comprised of a metal.

8. A detector in accordance with claim 1 wherein said substrate is gold, silver, nickel, or indinium tin oxide.

9. A detector in accordance with claim 2 wherein the thickness of each substrate is from about 1 micron to about 100 mils.

10. A detector in accordance with claim 2 wherein the thickness of at least one substrate is less than about 200 Angstroms.

11. A detector in accordance with claim 1 wherein the substrate is comprised of a metal.

12. A detector in accordance with claim 1 wherein the thickness of said ladder polymer layer is from about 0.1 to about 5 microns.

13. A detector in accordance with claim 1 with a dc dark conductivity of about $10^{-14}$ (ohm-cm)$^{-1}$.

14. A detector in accordance with claim 1 wherein the ladder polymer is of the following formula

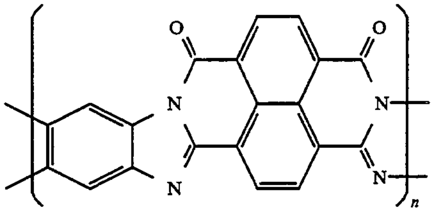

wherein n is a number from between about 10 and about 1,000.

15. A humidity detector consisting essentially of a supporting substrate and in contact therewith and coated thereover a ladder polymer wherein the ladder polymer is selected from the group consisting of those represented by the following formulas

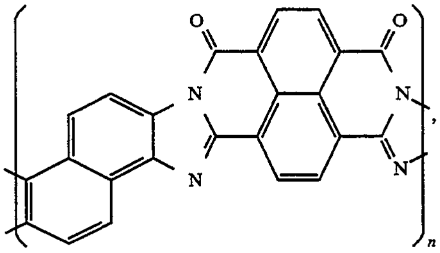

,

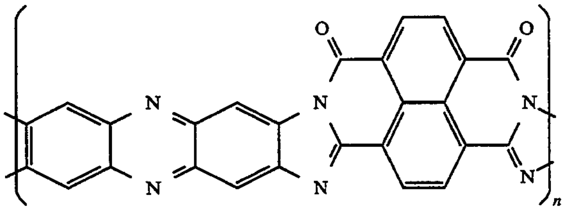

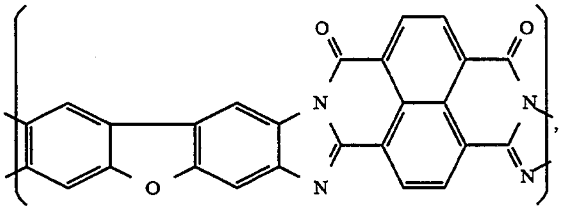

,

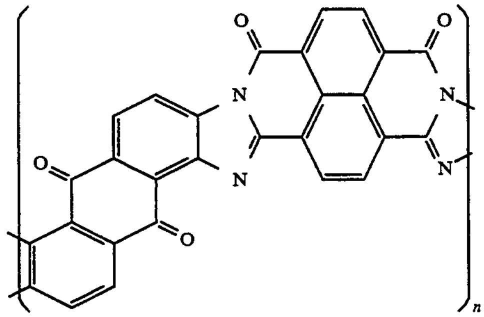

and mixtures thereof, wherein n represents the number of segments.

16. An imaging or printing apparatus containing a relative humidity detector, which detector consists essentially of a supporting substrate and in contact with said supporting substrate and coated thereover a ladder polymer selected from the group consisting of those represented by the following formulas

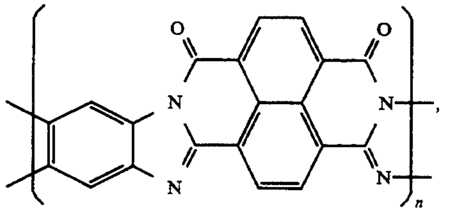

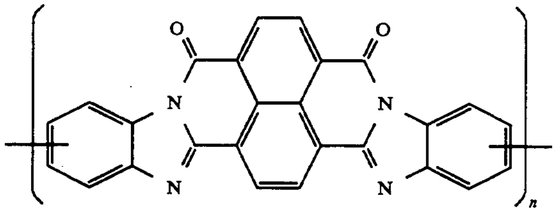

and mixtures thereof, wherein n represents the number of segments, and is a number of from about 10 to about 1,000.

17. An imaging or printing apparatus containing a relative humidity detector, which detector is comprised of two supporting substrates and in contact with said substrate a ladder polymer selected from the group consisting of those represented by the following formulas

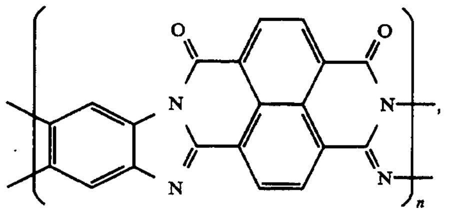

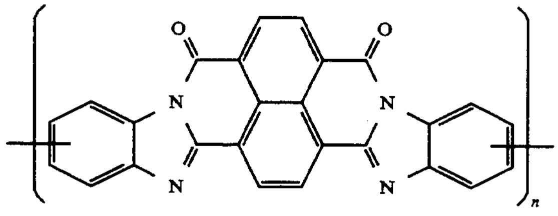

and mixtures thereof, wherein n represents the number of segments, and is a number of from about 10 to about 1,000.

18. An imaging or printing apparatus in accordance with claim 17 wherein the ladder polymer is situated between said substrates.

19. A humidity sensor comprised of a supporting substrate, coated over said substrate a ladder polymer selected from the group consisting of those represented by the following formulas

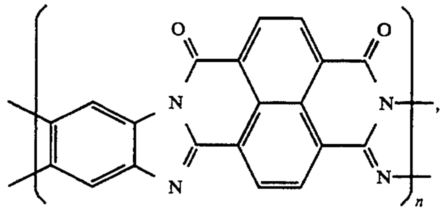

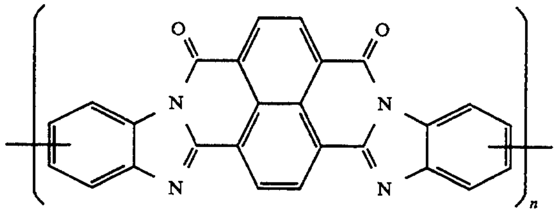

and mixtures thereof, wherein n represents the number of segments, and is a number of from about 10 to about 1,000; and coated thereover on said ladder polymer electrodes.

20. A humidity sensor in accordance with claim 19 wherein two areas of electrodes are present, and wherein said electrodes are effectively spaced from each other.

21. A humidity sensor in accordance with claim 20 wherein the electrodes are comprised of a metal.

22. A humidity sensor in accordance with claim 20 wherein the electrodes are comprised of gold.

23. A humidity sensor in accordance with claim 19 wherein two areas of electrodes are present.

24. A humidity sensor in accordance with claim 23 wherein said electrodes have a space therebetween of from about 1 micron to 5 about millimeters.

25. A humidity sensor in accordance with claim 19 wherein said electrodes have a space therebetween of from about 1 micron to about 5 millimeters.

26. A process for detecting humidity in electrostatographic imaging or printing apparatuses which comprises incorporating into said apparatus a humidity detector comprised of a supporting substrate and coated thereover a ladder polymer selected from the group consisting of those represented by the following formulas

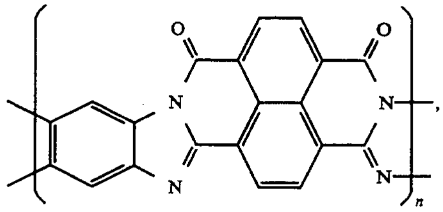

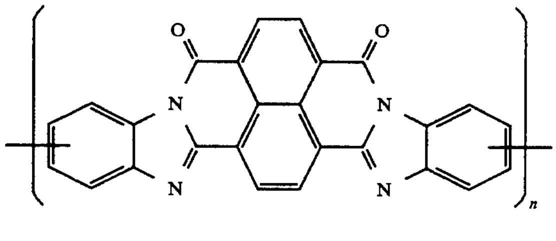

and mixtures thereof, wherein n represents the number of segments.

27. A process in accordance with claim 26 and wherein said ladder polymer is selected from the group consisting of those represented by the following formulas

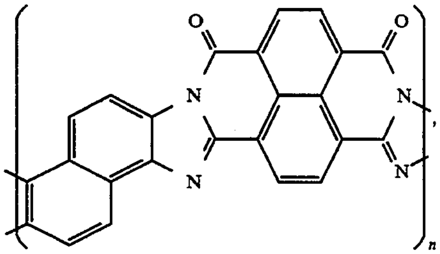

,

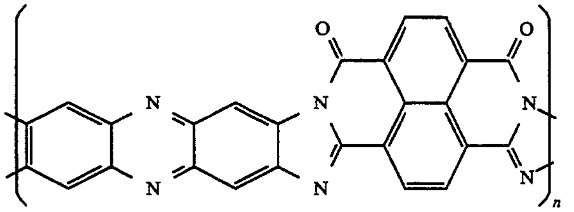

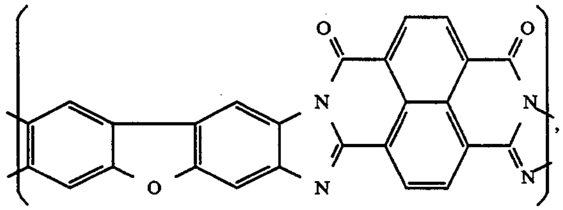

,

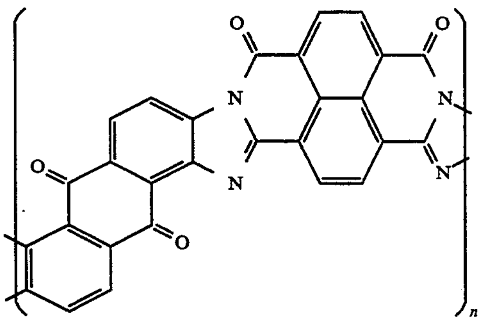

and mixtures thereof, wherein n represents the number of segments.

28. A process in accordance with claim 26 wherein the apparatus contains a photoconductive imaging member with a latent image thereon, which image is developed with a toner composition, and subsequently transferred to a supporting substrate, and wherein the relative humidity in said apparatus can be measured in the range of from about 0 to about 95 percent relative humidity.

29. A process in accordance with claim 28 wherein the relative humidity was 50 percent.

30. A process in accordance with claim 29 wherein the conductivity of said humidity detector is $4\times10^{-14}$ $(\text{ohm-cm})^{-1}$ in a vacuum of $10^{-7}$ Torr, and which conductivity is increased to about $10^{-10}$ $(\text{ohm-cm})^{-1}$ when the relative humidity in air is about 50 percent.

31. A process for detecting relative humidity in an imaging or printing apparatus containing a relative humidity detector, and which apparatus also contains a photoconductive imaging member, and wherein the detector comprises a plurality of supporting substrates and thereover a polymer, the improvement residing wherein said polymer is the ladder polymer selected from the group consisting of those represented by the following formulas

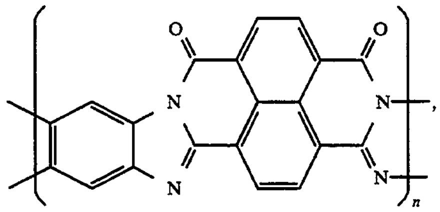

,

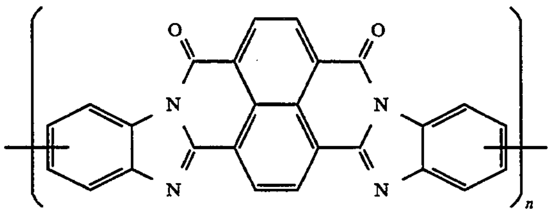

and mixtures thereof, wherein n represents the number of segments.

32. A process in accordance with claim 31 wherein two substrates are selected.

* * * * *